United States Patent [19]

Asami et al.

[11] Patent Number: 4,748,214

[45] Date of Patent: May 31, 1988

[54] MICROSPHERICAL CURED PHENOLIC RESIN PARTICLES AND PROCESS FOR PRODUCTION THEREOF USING EMULSION STABILIZERS

[75] Inventors: Keiichi Asami; Yoshiaki Echigo; Mutsunori Yamao; Yoshiyuki Suematu; Tadashi Ishikura; Ritsuko Shidei, all of Kyoto, Japan

[73] Assignee: Unitika Ltd., Hyogo, Japan

[21] Appl. No.: 862,728

[22] Filed: May 13, 1986

[30] Foreign Application Priority Data

May 13, 1985 [JP] Japan ................................. 60-103148

[51] Int. Cl.$^4$ .............................................. C08G 8/28
[52] U.S. Cl. .................................... 525/503; 525/504; 525/58; 525/480; 528/129; 524/596
[58] Field of Search ................. 525/503, 504, 58, 480; 528/129; 524/596

[56] References Cited

U.S. PATENT DOCUMENTS

| | | | |
|---|---|---|---|
| 2,156,124 | 4/1939 | Novotny | 525/504 X |
| 3,434,997 | 3/1969 | Schmoll | 525/503 X |
| 3,441,529 | 4/1969 | Tyler | 525/504 X |
| 3,472,915 | 10/1969 | Rider | 525/503 X |
| 3,928,526 | 12/1975 | Koyama | 525/503 X |
| 4,010,163 | 3/1977 | Hesse et al. | 525/503 X |
| 4,157,993 | 6/1979 | Funabiki et al. | 525/504 X |
| 4,316,827 | 2/1982 | Pacala et al. | 525/143 X |
| 4,640,971 | 2/1987 | Echigo et al. | 528/129 |

FOREIGN PATENT DOCUMENTS 4207778 11/1978 Japan .

OTHER PUBLICATIONS

Abstract of Japanese Patent Publication 42077/78, Toyo, May, 1976.
Encyclopedia of Chemical Technology, vol. 17, 373-375 & 384-387 (1982).

Primary Examiner—Howard E. Schain
Attorney, Agent, or Firm—Sughrue, Mion, Zinn, Macpeak & Seas

[57] ABSTRACT

A process for producing microspherical cured phenolic resin particles having a particle diameter of not more than about 100 µm, which comprises reacting a novolak resin, a phenol and an aldehyde in an aqueous medium in the presence of a basic catalyst and an emulsion stabilizer. Novel microspherical cured phenolic resin particles are produced by this process. The resin particles have excellent impact strength and mechanical properties, a sharp particle size distribution, and a low secondary agglomerate content, and because of these properties, are useful as an excellent modifier or filler for various plastics and rubbers.

18 Claims, No Drawings

MICROSPHERICAL CURED PHENOLIC RESIN PARTICLES AND PROCESS FOR PRODUCTION THEREOF USING EMULSION STABILIZERS

FIELD OF THE INVENTION

This invention relates to a novel process for producing microspherical cured phenolic resin particles, and to microspherical cured phenolic resin particles produced thereby.

BACKGROUND OF THE INVENTION

Various methods have previously been known for the production of microspherical cured phenolic resin particles. For example, U.S. Pat. Nos. 3,823,103, 4,026,828, 4,039,525 and 4,316,827 disclose methods for producing microspherical cured phenolic resin particles by subjecting phenols and aldehydes to emulsion polymerization in aqueous media in the presence of protective colloids such as gum arabic, gum ghatti, hydroxyalkylated guar gum or partially hydrolyzed polyvinyl alcohol, and a basic catalyst. According to these methods, microspherical phenolic resin particles having thermal reactivity are formed as solid particles of a so-called resol resin, and then under a selected set of reaction conditions, converted into microspherical cured resol resin particles.

Japanese Patent Publication No. 42077/78 discloses that not only microspherical resol resin particles having thermal reactivity but also microspherical cured resol resin particles can be produced by reacting a phenol with formaldehyde using a basic catalyst in the presence of a nitrogen-containing compound such as ethylenediamine, adding a hydrophilic organic polymer such as gelatin, casein, or polyvinyl alcohol to the resulting condensate, and continuing the reaction further. This patent document shows that the microspherical cured resol resin particles can be used as a lightweight filler for resins in the fields of molding materials, laminated articles, adhesives, etc.

U.S. Pat. No. 4,414,379 discloses a method for producing microspherical cured phenolic resin particles or microspherical phenolic resin particles having thermal reactivity by reacting a phenol with a large excess (8 to 10 mols per mol of the phenol) of formaldehyde in an aqueous medium using hydrochloric acid as a catalyst. Since this method is based on the reaction of the phenol and a large excess of formaldehyde, it differs from the aforesaid methods of producing microspherical cured resol resins. Table 9 of U.S. Pat. No. 4,414,379 shows the fluxural strengths of carbonized products obtained by mixing the microspherical cured phenolic resin particles obtained by the method of said patent and the aforesaid microspherical cured resol resin particles with a phenolic resin having thermal reactivity, molding the mixture, and subjecting the molded articles to a carbonizing treatment. When the microspherical cured resol resin particles are mixed, the resulting carbonized product has a very low flexural strength, and cannot be used for practical purposes. The fexural strength of the carbonized product obtained in the case of mixing the microspherical cured phenolic resin particles is not high and does not prove to be very satisfactory. Furthermore, the microspherical cured phenolic resin particles obtained by this method have the defect that their particle size distribution is broad and most of the resin particles become secondary agglomerated particles. In addition, this process is economically disadvantageous since formaldehyde is used therein in a large excess amount.

SUMMARY OF THE INVENTION

One object of this invention is to provide a process for producing microspherical cured phenolic resin particles having a particle diameter of not more than about 100 $\mu$m, and microspherical cured phenolic resin particles produced thereby, which have excellent impact strength and mechanical strength.

Another object of this invention is to provide a process for producing microspherical cured phenol resin particles, and microspherical cured phenolic resin particles produced thereby, having a narrow particle size distribution and being substantially free from secondary agglomerated particles.

The present inventors, as a result of extensive investigations, have now found that the above objects can be achieved by reacting a phenol with an aldehyde in the presence of a novolak resin.

According to this invention, a process is provided for producing microspherical cured phenolic resin particles having a particle diameter of not more than about 100 $\mu$m, which comprises reacting a novolak resin, a phenol and an aldehyde in an aqueous medium in the presence of a basic catalyst and an emulsion stabilizer. The invention also provides microspherical cured phenolic resin particles having a particle diameter of not more than about 100 $\mu$m produced by the above process.

Since the microspherical cured phenolic resin particles of this invention are obtained by using the novolak resin having linear polymer chain lengths, they have very good impact strength and mechanical strength exceeding those of the conventional microspherical cured resol resin particles or the microspherical cured phenolic resin particles produced by using a large excess of formaldehyde under acidity. Furthermore, the microspherical cured phenolic resin particles of this invention are an excellent filler for thermoplastic resin and can impart excellent thermal resistance and dynamic properties to molded articles prepared from a thermoplastic resin composition containing this filler.

Another advantage of the microspherical cured phenolic resin particles of this invention is that they have a narrow particle size distribution and scarcely contain secondary agglomerated particles.

The process of this invention can economically provide microspherical cured phenolic resin particles having very good impact strength, and does not require use an expensive raw material nor does it require complex steps.

DETAILED DESCRIPTION OF THE INVENTION

The novolak resin used in this invention is obtained by heating a phenol and an aldehyde (the phenol is used in an amount of about 0.8 to about 0.9 mol per mol of the aldehyde) in an acidic catalyst such as oxalic acid or hydrochloric acid to polymerize them, dehydrating the polymerization mixture under reduced pressure, cooling the product, and coarsely pulverizing it. Such a novolak resin is commercially available from novolak resin manufacturers such as Union Carbide Corporation, Dow Chemical Co., Monsanto Company, Mitsui Toatsu Chemicals, Inc. and Gun-ei Chemical Industry Co., Ltd. Specific examples include Bakelite Phenolic Resin BKR-2620, CKR-1634, CKM-2400 and CKM-5254 (manufactured by Union Carbide Corporation), Novolak Reson #3000, #6000, #7000 and #9000 (manufactured by Mitsui Toatsu Chemicals, Inc.), and RESITOP ® PSP-2322 and PSK-2222 (manufactured by Gun-ei Chemical Industry Co., Ltd.).

Novolak resins having low melting points of less than about 90° C. (measured by the method stipulated in JIS K-6910) are preferably used. One example of such novolak resins is #6000 of Mitsui Toatsu Chemicals, Inc. (melting point 70°-76° C.). When a novolak resin having a melting point of more than about 90° C. is used, the resulting microspherical cured phenolic resin particles tend to have a slightly broader particle size distribution.

The phenol and the aldehyde used to produce the novolak resin may be the same as the phenol and the aldehyde used in the process of this invention, which are more specifically described below.

The phenol used in the invention includes phenol and phenol derivatives such as m-alkylphenols, o-alkylphenols, and p-alkylphenols in which the alkyl moiety has 1 to 9 carbon atoms. Specific examples include m-cresol, p-tert-butylphenol, o-propylphenol, resorcinol, bisphenol A, and halogenated phenols resulting from substitution of a chlorine or bromine atom for some or all of the hydrogen atoms of the benzene ring or the alkyl groups. Mixtures of these phenols with each other may also be used. Suitable phenols are not limited to these specific examples, and any compounds containing phenolic hydroxyl groups may be used in this invention.

The amount of the phenol used in this invention is from about 40 to about 250 parts by weight, and preferably from 50 to 100 parts by weight, per 100 parts by weight of the novolak resin.

Examples of the aldehyde used in this invention include formaldehydes (formalin or paraformaldehyde) and furfural. The molar ratio of the aldehyde to the phenol is generally from about 1/1 to about 2/1 and preferably from 1.1/1 to 1.4/1.

The basic catalyst used in this invention may conveniently be any of those basic catalysts which are typically used in the production of ordinary resol resins. Examples are aqueous ammonia, and alkylamines such as hexamethylenetetramine, dimethylamine, diethylenetriamine, and polyethyleneimine. The molar ratio of the basic catalyst to the phenol is from about 0.01/1 to about 0.5/1, and preferably from 0.02/1 to 0.2/1.

The emulsion stabilizer used in this invention may be a substantially water-insoluble inorganic salt or a protective organic colloid. The substantially water-insoluble inorganic salt preferably has a solubility in water at 25° C. of not more than about 0.2 g/liter. Examples include calcium fluoride, magnesium fluoride, strontium fluoride, calcium phosphate, magnesium phosphate, barium phosphate, aluminum phosphate, barium sulfate, calcium sulfate, zinc hydroxide, aluminum hydroxide and iron hydroxide. Calcium fluoride, magnesium fluoride and strontium fluoride are preferred. The amount of the inorganic salt is preferably from about 0.2 to about 10 parts by weight, and especially preferably from 0.5 to 3.5 parts by weight, per 100 parts by weight of the phenol.

The substantially water-insoluble inorganic salt may be directly added to the reaction system. Preferably, however, two or more water-soluble inorganic salts are added so that such a water-insoluble inorganic salt is formed in situ during the reaction. For example, instead of adding a fluorine compound of calcium, magnesium or strontium, at least one water-soluble inorganic salt selected from the group consisting of sodium fluoride, potassium fluoride and ammonium fluoride and at least one other water-soluble inorganic salt selected from the group consisting of chlorides, sulfates and nitrates of calcium, magnesium and strontium are added and a fluorine compound of calcium, magnesium or strontium is formed during the reaction.

Preferred protective organic colloids include, for example, gum arabic, gun ghatti, hydroxyalkylated guar gum, and polyvinyl alcohol. The amount of the protective colloid is from about 0.01 to about 10 parts by weight, and preferably from 0.1 to 1.0 part by weight, per 100 parts by weight of the phenol.

A mixture of the water-insoluble inorganic salt and the protective organic colloid may also be used as the emulsion stabilizer in the process of this invention.

The particle diameter of the microspherical cured phenolic resin particles produced in this invention varies depending upon the amount of the emulsion stabilizer used, and decreases with increasing amounts of the emulsion stabilizer.

The aqueous medium used in the process of this invention is most preferably water. A mixture of water with a small amount of a water-soluble organic solvent such as methanol, ethanol or acetone may also be used. The amount of the organic solvent is preferably not more than about 5 parts per 100 parts by weight of water.

The amount of water used in the aqueous medium is preferably determined in an amount such that the solid amount of the cured phenolic resin formed by the process of this invention is in the range of from about 30 to about 70% by weight, more preferably 50 to 60% by weight, per 100% by weight of the sum of the cured phenolic resin and the aqueous medium.

The microspherical cured phenolic resin particles of this invention are produced by reacting the novolak resin, phenol, aldehyde, basic catalyst, emulsion stabilizer and aqueous medium at elevated temperatures. These materials may be fed by any method in any sequence. For example, the novolak resin is added to the molten phenol with stirring, and the mixture is heated at about 60° to about 80° C. and uniformly dissolved. Thereafter, the aldehyde, basic catalyst, emulsion stabilizer and water are charged successively. Another procedure comprises preparing a uniform solution composed of the phenol and the novolak resin in advance, charging the other materials into a reactor, and finally charging the solution into the reactor. Preferably, the operation of feeding the materials is carried out at a temperature in the range of from about 50° to about 80° C.

After all of the starting materials have been fed, temperature elevation is started with stirring. Preferably, the rate of temperature elevation is adjusted to from about 0.5° to about 1.5° C./min.

After the temperature of the reaction mixture reaches a predetermined point, the mixture is maintained at this temperature for a predetermined period of time. The preferred reaction temperature is in the range of from about 75° to about 98° C., and especially preferably from 75° to 95° C., most preferably 85° to 95° C. The preferred reaction time is from about 120 to about 240 minutes, and particularly preferably from 160 to 200 minutes.

Even when the reaction time is less than about 120 minutes, the microspherical cured phenolic resin particles are obtained, but the resulting phenolic resin particles tend to have a slightly lower impact strength.

After the reaction, the reaction mixture is cooled to about 40° C. or less, and subjected to solid liquid separation by filtration, centrifugation, etc. The solid is washed with, for example, water, and dried. As a result, the microspherical cured phenolic resin particles of this invention can be obtained.

The process of this invention can be carried out either batchwise or continuously. Typically, it is carried out batchwise.

In the process of this invention, the novolak resin dissolves in the phenol, and, therefore, the novolak and phenol mixture has a higher viscosity than in the case of the phenol only. Accordingly, the resulting particles tend to have a relatively narrow particle size distribution as compared with the case of not using the novolak resin.

For the foregoing reason, the process of this invention can easily give microspherical cured phenolic resin particles having a particle diameter of not more than about 100 μm and a narrow particle size distribution.

The term "cured", as used in the microspherical cured phenolic resin particles of this invention, denotes the state wherein the resin is no longer fusible. Specifically, this can be determined by the method of measuring the gel time of a thermosetting resin as stipulated in JIS K-6910, and refers to a state wherein the resin is not melted and its gel time cannot substantially be measured by the above measuring method.

The particle diameter of the microspherical cured phenolic resin particles of this invention can be measured by using a microscope at a magnification of about 300.

The particle size distribution of the microspherical cured phenolic resin particles of this invention can be measured by using a Coulter counter.

The term "microspherical" as used in the microspherical cured phenolic resin particles means that the particles are substantially spherical with a diameter of not more than about 100 μm. The microspherical cured phenolic resin particles of the invention, however, may contain those particles whose spherical shape is partly lacking, or those which are partly agglomerated secondarily.

The microspherical cured phenolic resin particles of this invention have much higher impact strength than conventionally known microspherical cured phenolic resin particles.

The impact strength of the microspherical cured phenolic resin particles of this invention can be measured by treating the resin particles using a stainless steel ball mill under the conditions as prescribed hereinafter, and represented by the ratio of crushed particles (to be referred to as the ratio of crushing). The resin particles of this invention also have excellent other mechanical strengths. These mechanical strength properties can be quantitatively evaluated by blending the resin particles with a thermoplastic resin such as nylon, molding the blend, and measuring the flexural strength, compressive strength and tensile strength of the molded article in accordance with JIS K-6910.

Because of their excellent impact strength and mechanical strength, the microspherical cured phenolic resin particles of the invention can be used as a modifier and a filler for various plastics and rubbers. They can also be used as a slip improving agent or an antiblocking agent.

The following examples illustrate the present invention more specifically. It should be understood, however, that the invention is not limited to these examples.

EXAMPLES 1 TO 3

A 3 liter three-necked flask equipped with a stirrer was charged with 180 g of phenol and 220 g of novolak resin (#6000, manufactured by Mitsui Toatsu Chemicals, Inc.; m.p. 70°–76° C.), and the materials were heated to 70° C. with stirring to dissolve the novolak resin in phenol. At the same temperature, 180 g of 37 wt % formalin, 350 g of water, 16.2 g of hexamethylenetetramine, 11.5 g of calcium chloride and 8.0 g of potassium fluoride were fed into the flask. The temperature was raised to 95° C., and the mixture was maintained at this temperature for 100 minutes. 200 ml of the contents of the flask were sampled, poured into 500 ml of water, and cooled to 30° C. The contents having a supernatant were filtered. The separated solid was washed with water and dried in air. It was then dried at 60° C. for 8 hours to form microspherical resin particles (designated as resin particles A).

The reaction mixture was sampled from the flask at 150 minutes and 180 minutes after the temperature of the contents reached 95° C., in the same manner as in the sampling of the reaction mixture after 100 minutes. The reaction mixtures sampled were each poured into 500 ml of water, cooled to 30° C. and filtered. The separated solids were washed with water, and dried to give microspherical resin particles (designated as resin particles B and C).

EXAMPLES 4 AND 5

A 1 liter three-necked flask equipped with a stirrer was charged with 60 g of phenol and 75 g of novolak resin (#6000 made by Mitsui Toatsu Chemicals, Inc.; m.p. 70°–76° C.), and the materials were heated to 70° C. with stirring to dissolve the novolak resin in phenol. Thereafter, 60 g of 37 wt % formalin, 120 g of water, 5.4 g of hexamethylenetetramine and 1.0 g of gum arabic were fed into the flask. The temperature of the contents was raised to 95° C., and the contents were maintained at this temperature for 180 minutes.

The contents of the flask were cooled to 40° C. and 0.5 liter of cold water was added. The supernatant was then removed, and the separated resin particles were washed with water and dried in air. The particles were then dried at 50° to 6020 C. for 8 hours to form microspherical phenolic resin particles (designated as resin particles D).

The above procedure was repeated except that 75 g of a different novolak resin (#7000 manufactured by Mitsui Toatsu Chemicals, Inc.; m.p. 82°–88° C.) was used instead of the novolak resin #6000 (Example 5). Microspherical phenolic resin particles (designated as resin particles E) were obtained.

EXAMPLES 6 TO 8

A 1 liter three-necked flask equipped with a stirrer was charged with 60 g of phenol and 75 g of novolak resin (#6000 manufactured by Mitsui Toatsu Chemicals, Inc.), and the materials were heated to 70° C. with stirring to dissolve the novolak resin in phenol. At the same temperature, 60 g of 37 wt % formalin, 120 g of water, 5.4 g of hexamethylenetetramine, 5.7 g of calcium chloride, 2.7 g of potassium fluoride and 0.6 g of polyvinyl alcohol (Mewlon type AA, a product of Unitika Chemical Co.) were introduced into the flask.

The contents of the flask were heated to 95° C., and maintained at this temperature for 180 minutes. After the reaction, the contents of the flask were cooled to 30° C., and worked up by the same operation as in Example 1, to provide microspherical phenolic resin particles (designated as resin particles F).

The above procedure was repeated except that the amount of polyvinyl alcohol added was changed to 2 g and 4 g, respectively (Examples 7 and 8). Microspherical phenolic resin particles (designated as resin particles G and H) were obtained.

C., filtered, washed with water and dried to give microspherical phenolic resin particles (designated as resin particles K).

The various properties indicated in Table 1 of the resin particles A to K obtained in Examples 1 to 8 and Comparative Examples 1 to 3 were measured, and the results are shown in Table 1.

TABLE 1

| | Resin Particles | | | | | | | | | | |
|---|---|---|---|---|---|---|---|---|---|---|---|
| | Example | | | | | | | | Comparative Example | | |
| Particular | A | B | C | D | E | F | G | H | I | J | K |
| Gel time (sec.) | The resin did not melt, and the gel time could not be measured | | | | | | | | | | |
| Average particle diameter (μm) | 40–50 | 40–50 | 40–50 | 40–50 | 40–50 | 30–40 | 20–30 | 10–20 | 40–50 | 40–50 | 10–20 |
| Particle size distribution (μm) | 30–60 | 30–60 | 30–60 | 30–60 | 30–60 | 20–50 | 10–40 | 7–30 | 30–60 | 30–60 | 5–70 |
| Secondary agglomerate content (%) | Hardly any formation of secondary agglomerated particles | | | | | | | | | | 40 |
| Impact resistance, the ratio of crushing (%) | 20 | 5 | 0 | 0 | 0 | 0 | 0 | 0 | 80 | 85 | 80 |
| Heat distortion temperature (°C.) | 120 | 140 | 163 | 165 | 165 | 167 | 168 | 170 | 70 | 70 | 110 |
| Flexural strength (kg/mm$^2$) | 10.0 | 12.0 | 15.0 | 15.0 | 14.2 | 15.1 | 15.3 | 15.5 | 8.9 | 8.5 | 7.5 |

COMPARATIVE EXAMPLE 1

A 1 liter three-necked flask equipped with a stirrer was charged with 200 g of phenol, 200 g of 37 wt % formalin, 140 g of water, 18 g of hexamethylenetetramine and 8.4 g of calcium chloride with stirring to form a uniform solution. Potassium fluoride (5.8 g) was added to the solution, and the mixture was heated to 95° C. over 60 minutes, and maintained at this temperature for 180 minutes to form an emulsion of microspherical resol resins. By the same work-up as in Example 1, microspherical resin particles (designated as resin particles I) were obtained.

COMPARATIVE EXAMPLE 2

Microspherical phenolic resin particles were prepared substantially in accordance with the method of U.S. Pat. No. 4,316,827.

Specifically, 200 g of phenol, 200 g of 37 wt % formalin, 140 g of water, 18 g of hexamethylenetetramine and 2.0 g of gum arabic were fed with stirring into a 1 liter three-necked flask equipped with a stirrer to form a uniform solution. The solution was heated to 95° C. over 60 minutes, and maintained at this temperature for 180 minutes to obtain an emulsion of microspherical resol resin particles. By the same work-up as in Example 1, microspherical resin particles (designated as resin particles J) were obtained.

COMPARATIVE EXAMPLE 3

Microspherical phenolic resin particles were produced substantially in accordance with the method of U.S. Pat. No. 4,414,379.

Specifically, a 2 liter three-necked flask was charged with an aqueous solution consisting of 405 g of 37 wt % formainl (i.e., solution containing 37 wt % of formaldehyde), 214 g of 35 wt % hydrochloric acid and 881 g of water, and then, 62.5 g of an aqueous solution consisting of 50 g of phenol, 8.4 g of 37 wt % formalin and 4.1 g of water was added. The mixture was stirred for 20 seconds and then left to stand for 60 minutes. Then, the mixture was heated to 80° C. over 60 minutes with occasional stirring, and stirred at this temperature for 30 minutes. The reaction mixture was then cooled to 30°

The properties indicated in Table 1 were measured by the following methods.

GEL TIME

Measured on a hot plate at 150° C. in accordance with JIS K-6910.

AVERAGE PARTICLE DIAMETER AND PARTICLE SIZE DISTRIBUTION

The proportions of particles having particular particle diameters were measured by a Coulter counter (Model TA-II, product of Nikkaki Corporation) at intervals of 1 μM for sizes of not more than 10 μm, at intervals of 10 μm for sizes of 10 to 100 μm, and at intervals of 100 μm for sizes of more than 100 μm. The average particle diameter is defined as the particle diameter of particles which exist in the highest proportion.

The particle size distribution is defined as the maximum and minimum particle diameter of particles which exist in 70% by weight of the particles measured.

SECONDARY AGGLOMERATE CONTENT

Measured visually using a microscope at a magnification of 300 ×.

IMPACT STRENGTH 20 g of resin particles were treated for 2 hours in a stainless steel ball mill having an inner capacity of 300 cc (made by Irie Shokai Co., Ltd.; Model U-1M; inside diameter 70 mm; depth 80 mm; rotating speed scale range 0–10; ball diameter 20 mm) while setting the rotating speed scale at 8. The ratio of the particles crushed was determined, and defined as the impact strength.

HEAT DISTORTION TEMPERATURE AND FLEXURAL STRENGTH 30 parts by weight of resin particles and 70 parts by weight of nylon 6 (BRL 1030, a product of Unitika Ltd.) were kneaded and extruded into pellets by using a Ko-kneader. Test specimens were prepared by injection molding of the pellets. After the test spoecimens were heat-treated at 150° C. for 3 hours, their heat distortion temperature (under a load of 18.6 kg/cm$^2$) was measured in accordance with ASTM D-648, and their flexural strength, in accordance with JIS K-6911.

The following conclusions can be drawn from the results set forth in Table 1.

Resin particles I and J produced under basic conditions without using a novolak resin (comparisons) had much the same particle size distributions and secondary agglomerate contents as resin particles A to H (invention), but were much inferior in impact strength, heat distortion temperature, and flexural strength.

Resin particles K produced under acidic conditions without using a novolak resin had a broad particle size distribution and a high secondary agglomerate content, and were inferior to resin particles A to H (invention) in impact strength, heat distortion temperature, and flexural strength.

In contrast, resin particles A to H obtained in accordance with this invention had sharper particle size distributions and lower secondary agglomerate contents, and higher impact strength, flexural strength, and heat distortion temperature than the comparative resin particles I to K.

While the invention has been described in detail and with reference to specific embodiments thereof, it will be apparent to one skilled in the art that various changes and modifications can be made therein without departing from the spirit and scope thereof.

What is claimed is:

1. A process for producing microspherical cured phenolic resin particles having a particle diameter of not more than about 100 $\mu$m, which comprises reacting a novolak resin, a phenol, and an aldehyde in an aqueous medium in the presence of a basic catalyst and an emulsion stabilizer, at a temperature of from about 75° to about 98° C.

2. A process as in claim 1, wherein the novolak resin is a novolak resin having a melting point of not more than about 90° C.

3. A process as in claim 1, wherein the amount of the phenol used is from about 40 to about 250 parts by weight per 100 parts by weight of the novolak resin.

4. A process as in claim 1, wherein the molar ratio of the aldehyde to the phenol is from about 1/1 to about 2/1.

5. A process as in claim 1, wherein the molar ratio of the basic catalyst to the phenol is from about 0.01/1 to about 0.5/1.

6. A process as in claim 1, wherein the emulsion stabilizer is a substantially water-insoluble inorganic salt present in an amount of from about 0.2 to about 10 parts by weight per 100 parts by weight of the phenol.

7. A process as in claim 1, wherein the substantially water-soluble inorganic salt is selected from the group consisting of calcium fluoride, magnesium fluoride, and strontium fluoride.

8. A process as in claim 1, wherein the emulsion stabilizer is a protective organic colloid present in an amount of from about 0.01 to about 10 parts by weight per 100 parts by weight of the phenol.

9. A process as in claim 1, wherein the reaction temperature is in the range of from about 75° to about 98° C. and the reaction time is from about 120 to about 240 minutes.

10. Microspherical cured phenolic resin particles having a particle diameter of not more than about 100 $\mu$m, said particles being obtained by reacting a novolak resin, a phenol, and an aldehyde in an aqueous medium in the presence of a basic catalyst and an emulsion stabilizer, at a temperature of from about 75° to about 98° C.

11. Microspherical cured phenolic resin particles as in claim 10, wherein the novolak resin is a novolak resin having a melting point of not more than about 90° C.

12. Microspherical cured phenolic resin particles as in claim 10, wherein the amount of the phenol used is from about 40 to about 250 parts by weight per 100 parts by weight of the novolak resin.

13. Microspherical cured phenolic resin particles as in claim 10, wherein the molar ratio of the aldehyde to the phenol is from about 1/1 to about 2/1.

14. Microspherical cured phenolic resin particles as in claim 10, wherein the molar ratio of the basic catalyst to the phenol is from about 0.01/1 to about 0.5/1.

15. Microspherical cured phenolic resin particles as in claim 10, wherein the emulsion stabilizer is a substantially water-insoluble inorganic salt present in an amount of from about 0.2 to about 10 parts by weight per 100 parts by weight of the phenol.

16. Microspherical cured phenolic resin particles as in claim 10, wherein the emulsion stabilizer is a protective organic colloid present in an amount of from about 0.01 to about 10 parts by weight per 100 parts by weight of the phenol.

17. A process as in claim 1, wherein said novolak resin is obtained by reaction of phenol with aldehyde in the presence of an acid catalyst.

18. Microspherical cured phenolic resin particles as in claim 10, wherein said novolak resin is obtained by rection of phenol with aldehyde in the presence of an acid catalyst.

* * * * *